United States Patent

[11] 3,626,325

[72] Inventor Michael R. Smith
    Thousand Oaks, Calif.
[21] Appl. No. 875,316
[22] Filed Nov. 10, 1969
[45] Patented Dec. 7, 1971
[73] Assignee BRITT Electronic Poducts Corporation
    Santa Monica, Calif.

[54] PULSED GAS LASER WITH RADIATION COOLING
    15 Claims, 6 Drawing Figs.
[52] U.S. Cl. .................................................. 331/94.5
[51] Int. Cl. ................................................... H01s 3/02
[50] Field of Search ...................................... 331/94.5;
                                                            330/4.3

[56] References Cited
    UNITED STATES PATENTS
3,379,998  4/1968  Soules et al. .................. 331/94.5
3,516,009  6/1970  Lipsett ......................... 331/94.5

Primary Examiner—William L. Sikes
Attorney—Lindenberg, Freilich & Wasserman

ABSTRACT: A pulsed gas laser having a ceramic tube in which lasing action takes place. The tube is surrounded by a glass envelope which forms a low-pressure environment around the tube so that the tube is cooled by thermal radiation. The tube is operable in a normal mode with a pulsing frequency in the range of 100 p.p.s. The tube is switchable to a burst mode in which the power input is increased tenfold to provide high average power output. Due to the radiation cooling even though the power input is increased tenfold and more, the tube's temperature only doubles remaining within safe limits for ceramic, and the gas density only changes by about 30 percent so that reasonable power output is obtained with any power input within the tenfold input range.

PATENTED DEC 7 1971
3,626,325
SHEET 1 OF 2
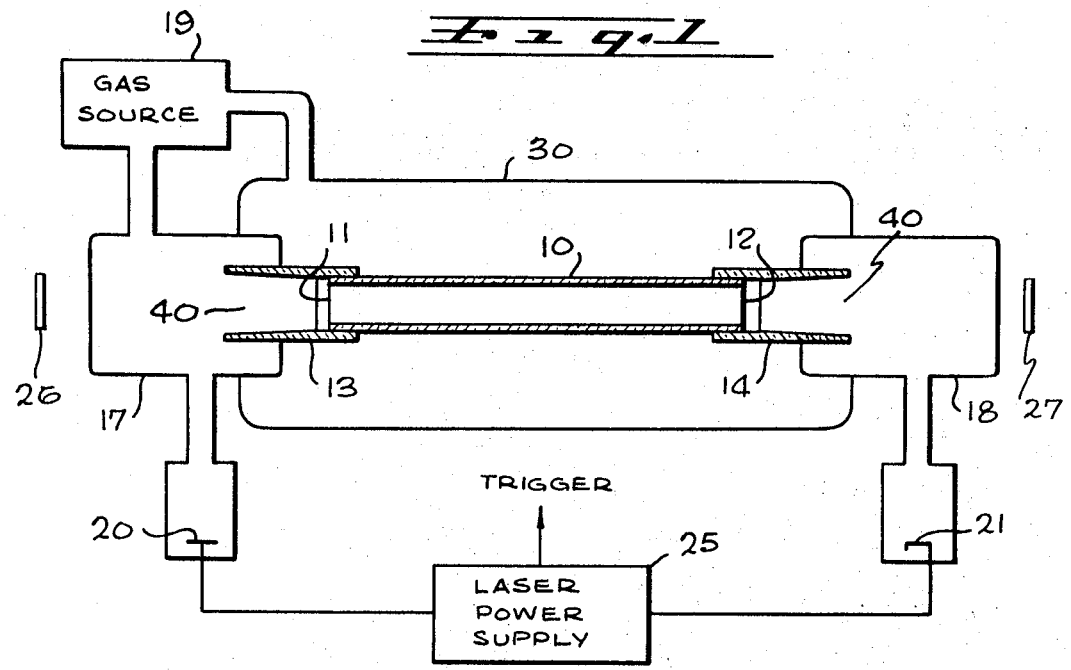
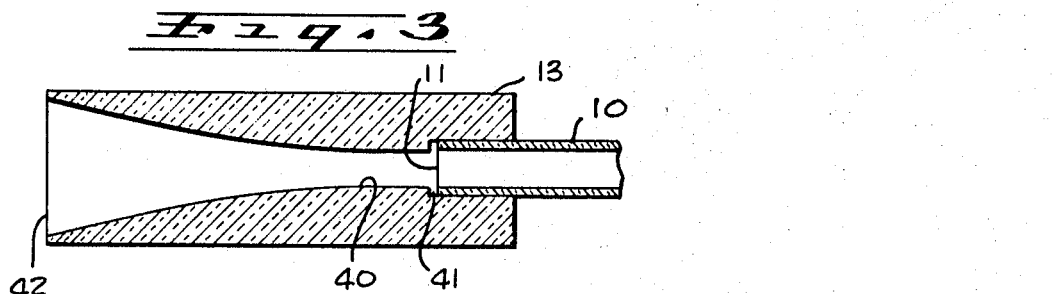
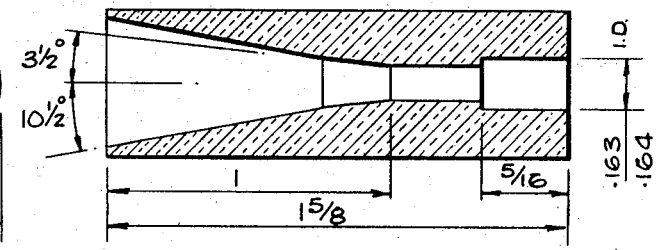
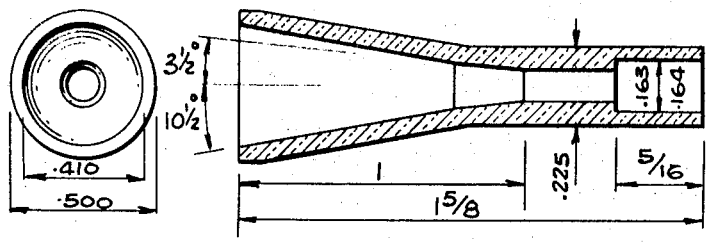
INVENTOR.
MICHAEL R. SMITH
BY
Lindenberg & Freilich
ATTORNEYS

MICHAEL R. SMITH
INVENTOR.

BY
Lindenberg & Freilich
ATTORNEYS

PULSED GAS LASER WITH RADIATION COOLING

BACKGROUND OF THE INVENTION

1. Field of the Invention

The present invention generally relates to lasers and, more particularly, to an improved pulsed gas laser, capable of exhibiting relatively high average power output.

2. Description of the Prior Art

At present, conventional pulsed gas lasers are designed to operate at relatively low duty cycles. Consequently, their average power output is quite low. This is particular disadvantage in applications in which relatively low average power output, typical of a conventional pulsed gas laser, is required during normal operation, together with high average power output during defined time intervals. None of the prior art pulsed gas lasers is capable of providing such a variable output with sufficiently high efficiency.

Prior art, continuous wave operation or CW gas lasers are capable of providing high average power outputs. However, they are much more expensive than pulsed lasers, since their construction is much more elaborate and complex, requiring the use of materials capable of withstanding high temperatures which are produced by continuous high average currents, needed in order to realize high average power outputs. Also, due to their CW operation, they do not provide pulses of power output with a high average power level.

As is appreciated by those familiar with the art, the production of ultraviolet radiation by means of an ionized gas laser requires very high currents, which are much higher than those needed to produce radiation in the visible spectrum. At present, the conventional materials which are used in practical CW gas lasers are either not capable of withstanding the high temperatures, or are not capable of dissipating the large amounts of heat energy, produced by optimum currents which are needed to produce ultraviolet (UV) radiation. Consequently, when such radiation is desired, the CW lasers are operated at currents which are significantly below the optimum currents. As a result, the power output is quite low. Alternately stated, the laser's efficiency is low. This is primarily due to the fact that in a gas laser, operated to produce UV radiation, the power output is a function of the current to the third or higher powers. Thus, any deviation from the desired optimum current results in a significant reduction in power output.

Due to these limitations of the prior art gas lasers, a need exists for a pulsed gas laser which is capable of providing high average power output during defined intervals. A further need exists for a relatively simple gas laser which is capable of efficient production of UV radiation. Still a further need exists for a pulsed gas laser with continuous average power output which is higher than that realizable with prior art pulsed gas lasers.

OBJECTS AND SUMMARY OF THE INVENTION

It is a primary object of the present invention to provide a new improved pulsed gas laser.

Another object of the invention is to provide a pulsed gas laser with a novel gas discharge tube structure which enables the laser to provide relatively high average power output.

Yet another object of the present invention is the provision of a pulsed gas laser operable over a wide variation of average power input.

A further object of the present invention is to provide a new pulsed gas laser, capable of satisfactory performance with relatively large variations in average power input.

Still another object of the present invention is the provision of a new, relatively inexpensive pulsed gas laser, capable of efficient production of UV radiation.

Yet, a further object of the present invention is to provide a relatively inexpensive pulsed gas laser characterized by a dual mode of operation, the modes including a normal mode in which the laser is operated at a first duty cycle, and a burst mode in which the laser's duty cycle is greatly increased to provide high average power output.

These and other objects of the invention are achieved by providing a pulsed gas laser with a novel gas discharge tube structure. This structure enables the laser to operate at temperatures which are significantly higher than the operating temperatures, characteristic of conventional pulsed gas lasers. Indeed, the temperatures which the tube structure is capable of withstanding are in the range of temperatures, characterizing CW gas lasers. The tube structure includes an elongated tube of material, such as ceramic, which is capable of withstanding safely temperatures at least up to 1,500° C. This tube, which is placed in the laser's gas path and in which the lasing action takes place, is enclosed within a glass envelope.

The diameter of the envelope is chosen so that at the tube's temperatures of operation, heat flow from the tube into the envelope is mainly due to thermal radiation, rather than to thermal conduction. Thus, the tube is cooled by radiation. Due to such radiation cooling, the laser is capable of responding to a very large increase in average power input, representing a high duty cycle, to produce a significant increase in average power output, without raising the tube's temperature above the limits, tolerable by the material of which the tube is fabricated. Indeed, the cooling of the tube by radiation enables one to operate the laser to produce the very high peak currents, which are needed for the production of UV radiation with high average power output, without exceeding the tube's temperature limits. Thus, UV radiation may be produced at high efficiency. Alternately stated, high average power output of UV radiation is obtainable with the novel laser of the present invention.

The novel features of the invention are set forth with particularity in the appended claims. The invention will best be understood from the following description when read in conjunction with the accompanying drawings.

BRIEF DESCRIPTION OF THE DRAWINGS

FIG. 1 is a combination side and cross-sectional view of the laser of the present invention;

FIG. 3 is a cross-sectional view of a throat member, forming part of the present invention;

FIGS. 4a and 4b are cross-sectional views of other embodiments of the throat member.

DESCRIPTION OF THE PREFERRED EMBODIMENTS

Figure 2:
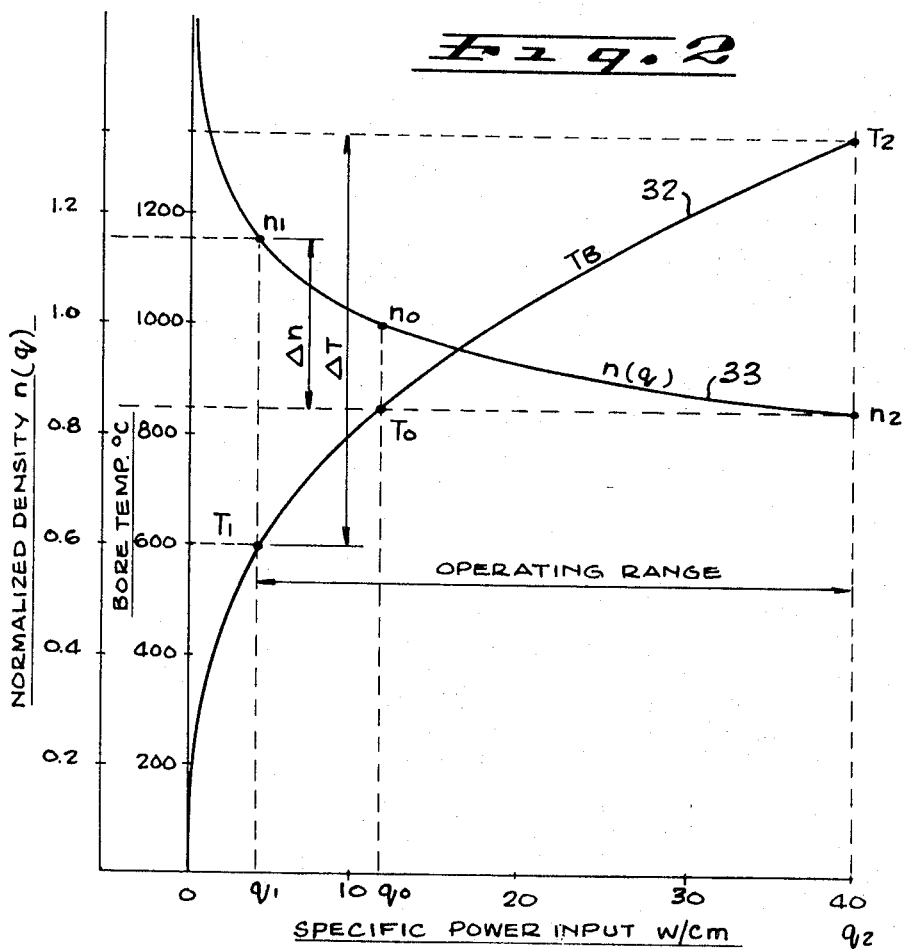
FIG. 2 is a diagram of the tube temperature and gas density versus power input.

Attention is first directed to FIG. 1 which is primarily a cross-sectional view of the discharge tube structure of the present invention, forming part of the pulsed gas laser. The structure comprises an elongated gas tube 10 with its ends 11 and 12 slip fit in end support members 13 and 14, respectively. In practice, the length-to-diameter ratio of tube 10 is much greater than that shown in FIG. 1. In accordance with the teachings of the present invention, in operation the tube's temperature is nearly always above 500° C., reaching temperature of 1,200° C. and more. Consequently, the tube 10 is fabricated of a material, capable of satisfactory performance at such temperatures. One type of such a material is refractory ceramic. Hereafter, for explanatory purposes, the tube 10 may be referred to as the ceramic tube. Since the end members 13 and 14 come in contact with the ceramic tube, which may be at high temperatures, they are also fabricated of ceramic. These members may be referred to as ceramic throats, since they define throatlike openings in which the tube's ends are supported. Preferably, the tube ends are slip fittingly supported in the ceramic throats. The purpose of the slip fit is to enable the tube to freely expand along its longitudinal axis as the tube's temperature rises.

Sealed to ceramic throats 13 and 14 are glass end members 17 and 18, respectively. The former is in communication with a gas source 19 and an anode 20, while the latter is in communication with a cathode 21. The anode and cathode are shown connected to a laser power source 25, which is assumed to supply the peak currents necessary for lasing action as well as the trigger pulses, required in any pulsed laser. If desired, the end members 17 and 18 may be interconnected to provide a gas path between the anode and the cathode. As in any conventional laser, the laser of the present invention includes a pair of mirrors 26 and 27, which are disposed along the longitudinal axis of the tube 10 in which the lasing action takes place. Mirror 27 may be assumed to represent the output mirror, through which the produced light radiation exits.

Up to this point in the description the laser of the present invention is quite similar to a conventional pulsed gas laser. The only differences are that in the present laser the tube 10, in which lasing action occurs, is made of ceramic or like material, capable of safe operation at the high temperatures which the laser of the present invention may reach. In a conventional pulsed gas laser the gas tube and/or the means used to support it are made of glass since a conventional pulsed gas laser, typically operates at temperatures below 300° C. The temperatures of the tube of a conventional pulsed gas laser never reached temperatures as high as 500° C. or more. Also, in the present invention ceramic, rather than glass, throats are included to support tube 10 due to the tube's high temperatures. Furthermore, the power supply 25 of the present invention differs from a conventional pulsed gas laser power supply in that it is capable of controlling the laser's duty cycle over a very large range. One particular embodiment of power supply 25 will be described hereafter in detail.

As seen from FIG. 1, the discharge tube structure of the present invention includes an envelope 30, which is sealed to end members 17 and 18. The envelope 30 encloses the ceramic tube 10. If the ends of tube 10 are fixedly supported in throat members 13 and 14, the envelope may be evacuated to provide a vacuum around tube 10. However, when the slip fit arrangement is employed it is preferred to have the envelope in communication with gas source 19, which provides the gas at the required low pressure or density needed in a pulsed gas laser. In such an arrangement the gas at the low density fills the envelope.

The primary function of the envelope 30, whose inside diameter (ID) is much greater than the outside diameter (OD) of tube 10, is to provide around tube 10 a relatively large volume of space at a very low gas pressure or density. Although gas is present in the tube, due to the low thermal conductivity of the gas and in particular due to the high temperature of the tube 10 relative to the temperature of the envelope which is of a much larger diameter heat from the external surface of the ceramic tube 10 is predominantly removed by thermal radiation. It is the cooling of the tube 10 by thermal radiation, which is the basic feature of the present invention.

The envelope may be constructed of any material which is capable of forming an evacuated or gastight vessel, and one which is capable of absorbing and/or transmitting heat which radiates thereto from the tube 10. In one embodiment the envelope was fabricated of glass. For explanatory purposes the envelope 30 and members 17 and 18 will be described as consisting of glass. It is intended however that any material which is capable of forming an evacuated or gastight vessel can be used for any of these elements. Such material may include, though not limited to different types of glass, quartz, ceramic and the like.

As is appreciated by those familiar with the laws governing thermal radiation, the total radiation from a radiator is a function of the fourth power of the radiator's absolute temperature T. That is $q \approx T^4$. This law, known as the Stefan-Boltzmann law, is sometimes called the Fourth Power Law. Since a conventional pulsed gas laser operates at relatively low temperatures the amount of heat which can be withdrawn by radiation is quite low. Consequently, therein, cooling by conduction or convection is employed. However, in the present invention the laser is operated so that the tube 10 reaches relatively high temperatures. Consequently, the provision of the envelope 30 to enable the tube 10 to be cooled by radiation is most significant since it enables significant amounts of heat to be withdrawn from the tube at its high temperatures of operation. As will become apparent from the following description, it is the radiation cooling of the tube 10 which enables the laser to exhibit relatively high average power output, by enabling it to respond to high average power input without resulting in excessive tube temperatures.

The temperature and gas density of the tube 10, which is cooled by radiation, as a function of average power input may best be summarized in conjunction with FIG. 2 wherein tube temperature in degrees C. and normalized gas density are plotted against specific average power input in watts per centimeter (w./cm/). The temperature versus average power input is represented by line 32, while line 33 represents the relationship of gas density versus average power input. The temperature and average power input values shown in FIG. 2 represent actual values experienced with an embodiment which was actually reduced to practice. The gas tube comprised a ceramic tube, 27 cm. long with an ID of 2.4 mm. and an OD of 4 mm. The glass envelope 30 had an ID of 2.5 cm. and a thickness of 1.5 mm.

Let it be assumed that the pressure of density of the gas, supplied by source 19, is set so that when the average power input is $q_o$, the bore gas density is $n_o$ representing a normalized value of 1, and the temperature is $T_o$. As is appreciated, as the average power input increases, the temperature rises and the gas density decreases. However, due to the radiation cooling the change in temperature is much less than the average power input change. Thus, a significant average power input may be tolerated without increasing the tube's temperature beyond a value which is safe for the ceramic tube of the novel discharge tube structure of the present invention. From FIG. 2, it is seen that in the particular embodiment a change of average power input from $q_1$ (approximately 4 w./cm.) to $q_2$ (about 40 w./cm.), representing a tenfold increase in average power input, or in the laser's duty cycle, results in only the doubling of the tube temperature while the gas density decreases by only ⅓.

The fact that the gas density does not change by more than ⅓ over such a wide range of average power input is very significant. It enables one to operate the laser at or near optimum gas density with any average power input within the selected range. Thus, optimum or near optimum peak power output is achieved even though the laser's average power input may change many fold. In practice, the density of the gas from source 19 is chosen so that optimum gas density exists in the tube for a particular average power input level, and therefore optimum peak power output for such an input. Near optimum peak power output is realized as the average power input changes within the selected range.

Furthermore, due to the fact that the change in the tube's temperature is not more than double even with a tenfold increase in average power input, the novel laser of the present invention may be operated at the higher average power input without exceeding the temperature limits of the various parts of the radiation cooled discharge tube structure. The higher average power input, representing a higher duty cycle, results in a significant increase in the laser's average power output. As is appreciated, the laser's duty cycle or average power input can be increased either by increasing the durations of the laser's pulses or by increasing the pulsing rate.

In one particular embodiment the novel tube structure was incorporated in a pulsed gas laser which was operated in a dual mode of operation, hereafter defined as the normal and burst modes. In the normal mode of operation, the laser was pulsed at a rate of 100 p.p.s. with an average power input 4.8 w./cm., resulting in a tube temperature of approximately 600° C. The laser was operable in this mode for prolonged periods of time, without any adverse effect on the tube's structure.

The particular laser was switchable to the burst mode of operation by increasing the pulse rate to over 1,100 p.p.s. This resulted in a very significant increase in average power input.

In the burst mode, even though the average power input was increased to 40 w./cm., due to the radiation cooling, the tube's temperature reached only a value of 1,200° C., which was within the safe range for the ceramic tube. In the particular laser, the gas density was chosen to be optimum at the high temperatures, i.e., when the laser was in the burst mode so that with the particular peak currents which were applied peak power output was optimized. Since in the burst mode due to the higher duty cycle higher average power output is realized, by optimizing the gas density for the burst mode temperatures of operation optimum high average power output is achieved.

From the foregoing it should thus be appreciated that by providing a discharge tube structure which includes a tube which is coolable by thermal radiation in a pulsed gas laser, the laser may be operable over a large power input range. Such a laser is operable in a normal mode with relatively low average power input and in a burst mode in which high average power input results in the production of high average power output. This capability is due to the radiation cooling which insures that even with the high average power input the tube's temperature does not exceed the tube's material limitations, and that the tube's temperature remains in a range in which the density of the gas changes by only a limited percentage. Consequently, irrespective of the average power input, optimum or near-optimum gas density is achieved over the entire input range to result in optimum or near optimum peak power output.

In accordance with the present invention the radiation cooling of the ceramic tube 10 is achieved by enclosing the tube in the envelope 30 which has a diameter which is significantly greater than the OD of tube 10. When the envelope 30 is in communication with gas source 19, the envelope provides a relatively large volume or space which is at the very low pressure of the gas from source 19. Such a large space enables the efficient cooling of the tube 10 by the thermal radiation, particularly at the higher temperatures which occur in the burst mode. To ensure efficient cooling predominantly by radiation it is necessary that the diameter of the envelope 30 be appreciably greater than the OD of the tube 10. This is necessary in order to provide a large volume around the tube which is either at vacuum or which is filled by a low-pressure gas with low thermal conductivity so as to minimize heat transfer by conduction. Also the envelope's diameter must be large so that heat transferred thereto from the tube by radiation does not increase the envelope's temperature above safe limits.

In FIG. 1, each of the throat members 13 and 14 is shown having a central opening 40 of uniform diameter. The opening provides a gas path to and from the ceramic tube 10. It has been discovered that superior performance of the laser is achieved by providing throat members with openings whose cross-sectional areas decrease exponentially from the ends exposed in the glass end members 17 and 18 toward the ends adjacent the tube 10. A cross-sectional view of one of the throat members, such as member 13, is shown in FIG. 3, to which reference is now made. Therein, numeral 41 designates the opening's end at which end 11 of tube 10 is slip fit while numeral 42 designates the opposite end.

The shape of bore 40 from end 42 to end 41 may be expressed as $$A(X) = (A_0 - A_\infty) e^{-x/L} + A_\infty,$$

where $X$ is the distance from the end 42, $A_0$ the cross-sectional area at end 42, $A_\infty$ is an asymptotic value which the cross-sectional area of the throat would reach if it were extended indefinitely toward the tube 10. However, the taper is terminated at 41, and $L$ is a parameter which describes how rapidly the area of the opening, $A(X)$ converges to the asymptotic value $A_\infty$.

The cost of fabricating such a throat member may be greatly reduced by forming the bore 40 as a series of simplified segments which closely approximate the shape of the desired bore. Two examples of such bores which were actually reduced to practice are diagrammed in FIG. 4a and 4b for throat members designed to accommodate the ceramic tube 10 with an OD of 4 mm. It should be appreciated that these throat members are presented as examples of practical implementations of the teachings of the invention rather than to limit the scope thereof.

Figure 5:
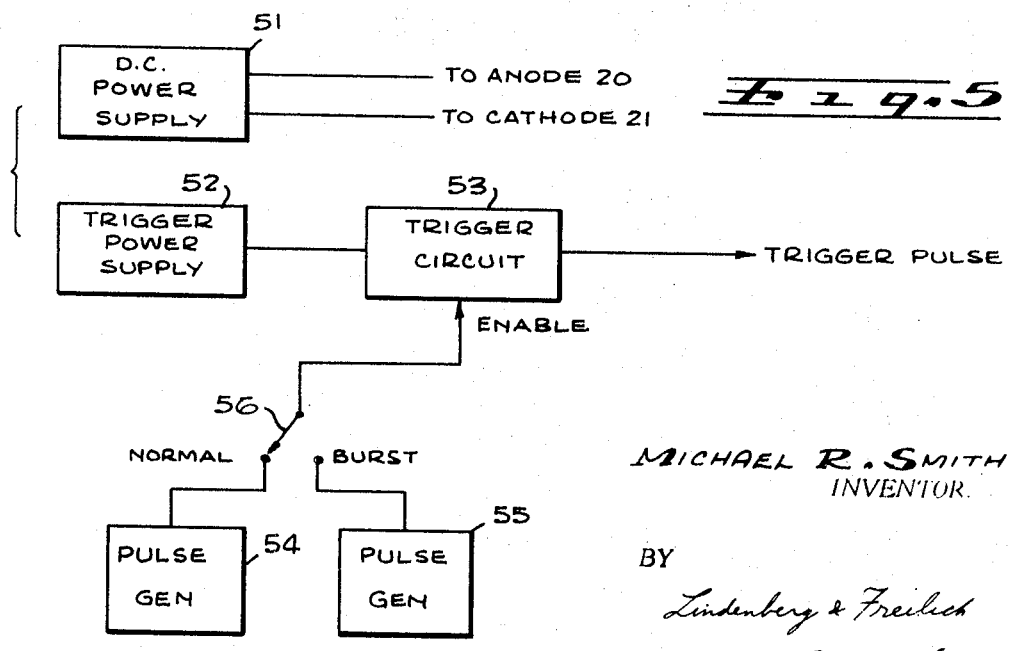
FIG. 5 is a simple block diagram of one example of a power supply, needed for the operation of the present invention.

Attention is now directed to FIG. 5 which is a simple block diagram of one embodiment of the laser power supply 25 (see FIG. 1). In the pulsed gas laser of the present invention the power supply 25 is required to supply the appropriate DC power to the anode 20 and cathode 21 as well as supply the trigger pulses, which are necessary to pulse the laser. In order for the laser to be operable in the normal mode of operation, as well as in the burst mode of operation, the power supply includes means which control the repetition rate or the frequency of the trigger pulses.

As seen in FIG. 5, the power supply 25 is assumed to include a DC power supply unit 51 which is connected to the anode 20 and cathode 21. It also includes a trigger power supply unit 52 which provides power to a trigger circuit 53 which, when enabled, provides a trigger pulse which triggers the laser in a manner well known by those familiar with pulsed lasers.

For explanatory purposes only it is assumed that the trigger circuit is enabled by pulses provided by either a pulse generator 54 or a pulse generator 55. Either of these generators is shown to be selectively connected to the trigger circuit 53 by means of a mode switch 56. Generator 54 is assumed to provide enabling pulses at a low rate or frequency, such as 100 p.p.s. which are needed for the laser's normal mode of operation, while generator 55 is assumed to provide pulses at a much higher rate, such as 1,100 p.p.s., which are needed to operate the laser in the burst mode. Thus, laser mode selection is accomplished by controlling the position of switch 56.

Preferably, generator 55 includes a timing unit to limit the duration or interval during which generator 55 produces the pulses at the high rate to thereby limit the interval during which the laser is in the burst mode. Also, preferably generator 54 may include means to vary the frequency of its pulses over a selected range in order to vary, within this selected range, the laser's average power input in the normal mode.

The circuit arrangement shown in FIG. 5 is presented for explanatory purposes rather than as a limitation of the invention. In one actual reduction to practice, the two pulse generators 54 and 55 were replaced by a relaxation oscillator with a capacitor which was charged through a variable resistor, thereby controlling the frequency of the oscillator's output pulses which were used to enable the trigger circuit 53. To switch the laser to the burst mode, fixed resistors were shunted across the variable resistor during controlled time intervals, thereby reducing the time constant of the resistor-capacitor network which resulted in an increase in the frequency of the oscillator's output pulses.

Herebefore, the particular gas which may be used in connection with the laser of the present invention as well as the desired gas density were not specified. As is appreciated by those familiar with pulsed gas lasers, various gases including the noble gases, such as argon and krypton, may be employed in such lasers. Any one of these gases may be employed in the present invention.

In the present invention the gas density is chosen so that with a particular average power input, within the large range of average power input with which the laser is capable of operating, an optimum operating gas density exists in order to provide optimum peak power output. However, since in the present invention the change in the gas density over the entire input range is in the range of 30 percent when the average power input differs from the particular input for which the optimum gas density was chosen, near-optimum operating gas density is present. Thus, near-optimum peak power output is realized. This is not the case in the prior art in which a large change in average power input from the design input results in a very large change in the operating gas density so that low power output is produced.

In the particular example which was reduced to practice, argon gas was employed. The gas density was selected to be approximately $0.6 \times 10^{15}$ cm.$^{-3}$ at a temperature of 1,200° C. which occurred at the burst mode. It should be appreciated that a gas other than argon at a density chosen for a different operating temperature may be employed without departing from the spirit of the invention. For example, if krypton were used it would require a lower density for the same operating temperature.

It should be appreciated that those familiar with the art of lasers may make modifications in the specific examples used to describe the invention without departing from the spirit thereof. For example, in FIG. 1, the envelope 30 is shown to be in communication with the gas source 19. This is advantageous for two reasons. First, during the initial processing of the tube (during manufacture) gas impurities must be evacuated from region 30. Second, during operation of the tube, the connection allows the regions 30 and 17 to reach thermodynamic equilibrium quickly and hence avoids any bad effect due to nonequilibrium between the regions. However, it should be appreciated that one may eliminate such a connection without departing from the spirit of the invention.

Herebefore, the invention has been described in connection with a dual mode of operation. It was assumed that the laser is operable in either a normal mode in which average power input is at or near the lower limit of the input range, so that the tube's temperature is about 500° C., or in a burst mode in which the average power input is near the upper input range so that a temperature of about 1,200° C. is experienced. It should be apparent that if desired the laser may be operated with an average power input which is variable over the entire range. The laser may be operated continuously with any desired average power input as long as the temperature of the tube does not exceed the upper temperature limit.

Generally, a time lag exists between the time when an average power input of a given value is applied and the time the tube's temperature reaches a value corresponding to the particular power input. Such time lag may be used to great advantage in the present invention. Average power input which is substantially higher than the maximum allowable average power input for continuous use may be applied for short durations. The durations are chosen so that the average power input returns to a value within the input limits for continuous laser operation before the tube's temperature exceeds its temperature upper limit. Using FIG. 2 and assuming that continuous average power input of 40 w./cm. results in a tube temperature of 1,300° C., the average power input may be raised for short durations to exceed 40 w./cm. as long as the input drops back to a lower level before the tube's temperature exceeds 1,300° C.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In a pulsed gas laser of the type including a source of gas, an anode, a cathode, means for providing a path of gas between said anode and cathode, said means including an elongated tube in which lasing action occurs, power supply means coupled to said anode and cathode, and pulsing means for triggering said laser to produce output pulses of energy, the improvement comprising:
envelope means enclosing said tube to provide a low-pressure environment about the exterior of said tube for enabling heat to be removed from said tube by thermal radiation, said tube being made of a refractory ceramic, said envelope means is made of a material selected from the group consisting of glass and quartz, with the diameter of said envelope means being equal to several times the outer diameter of said tube, the tube's temperature reaching a value in the range of 600° C. when said average power input is in the range of 4 watts per centimeter (w./cm.) and a value in the range of 1,300° C. when said average power input is in the range of 40 w./cm.

2. In a pulsed gas laser of the type including a source of gas, an anode, a cathode, means for providing a path of gas between said anode and cathode, said mean including an elongated tube in which lasing action occurs, power supply means coupled to said anode and cathode, and pulsing means for triggering said laser to produce output pulses of energy, the improvement comprising:
envelope means enclosing said tube to provide a low-pressure environment about the exterior of said tube for enabling heat to be removed from said tube by thermal radiation, said tube being of a material having a melting temperature above 1,500° C., said laser further including a pair of throat means for slip fittingly supporting the opposite ends of said tube within said envelope means which comprises an envelope of a diameter substantially greater than the outside diameter of said tube, and of a material selected from the group consisting of glass, ceramic and quartz, whereby an $n$ fold increase in the laser's average power input results in only an increase in the tube's temperature so that the operating density of the gas in said tube from said source decreases by less than 50 percent, where $n$ is in the range of 10.

3. The arrangement as recited in claim 2 wherein each of said throat means defines an axial opening having a diameter which increases from one end of said throat means at which one end of the tube is supported toward an opposite end of said throat means.

4. The arrangement as recited in claim 2 wherein the diameters of the envelope and the tube are related by a factor in the range of greater than 3, so that with a power input in the range of 4 watts per centimeter, the tube's temperature is in the range of 600° C. and with an average power input of about 40 watts per centimeter the tube's temperature is about 1,300° C.

5. The arrangement as recited in claim 4 wherein each of said throat means defines an axial opening having a diameter which increases from one end of said throat means at which one end of the tube is supported toward an opposite end of said throat means.

6. In a pulsed gas laser of the type including a source of gas at a preselected pressure, an anode, a cathode, means for providing a gas path between said anode and said cathode, said means including an elongated tube in which lasing action takes place, power supply means coupled to said anode and to said cathode and laser pulsing means, the improvement comprising:
an elongated tube of refractory ceramic;
tube support means of refractory ceramic for slip fittingly supporting said tube in which lasing action takes place in said gas path; and
seal means including a gastight envelope connected to said tube support means for enclosing said tube in said envelope to provide a relatively low-pressure environment about said tube which is expandable into said tube support means in which it is slip fittingly supported when operable over a relatively wide range of average power input, resulting in tube temperatures varying between a low temperature value in the range of 600° C. and a high-temperature value in the range of 1,300° C., with substantially all the heat which is removed from said tube is transferred to said envelope by thermal radiation.

7. The arrangement as recited in claim 6 wherein said tube support means comprise a pair of elements each with a cavity in one end thereof, the cavity of each element is sufficiently deep to slip fittingly support one end of said tube therein and enable said tube to extend longitudinally into said cavity as a function of increased tube temperature.

8. The arrangement as recited in claim 7 wherein the longitudinal opening of each element is cylindrical extending from the cavity end to the opposite end, the diameter of said cylindrical opening increasing from said cavity end to said opposite end.

9. The arrangement as recited in claim 7 further including means for providing a direct gas path between said envelope and said gas source, whereby the gas pressure in said envelope about said tube is substantially equal to the gas pressure in said source, with the gas path between said anode and cathode passing through said pair of elements of said tube support means and said tube without passing through said envelope.

10. A pulsed gas laser comprising:
a source of gas at a selected pressure;
a cathode;
an anode;
an elongated tube;
support means for supporting said tube between said anode and said cathode, including a pair of elements, each element defining a cavity at one end for slip fitting one end of said tube therein, each element further defining a longitudinal opening extending from said cavity end to an opposite end of the element to provide an open path between said anode and cathode through said tube;
power supply means coupled to said anode and to said cathode and including laser trigger means for triggering said tube so that lasing action occurs therein in response to an average power input which is selectively variable over a range having an upper limit which is $n$ fold the range lower limit, with the tube's temperature being above 300° C. when the average power input is at said range lower limit;
envelope means directly coupled to said support means and enclosing said tube for providing a surface which is cooler than said tube, whereby substantially all the heat which is removed from said tube radiates to said envelope means, so that the tube's temperature changes by less than said factor $n$ over the entire average power input range; and
means for coupling said source to said support means for providing a gas path therebetween, whereby gas at said selected pressure fills the space between said anode and cathode through said tube.

11. The arrangement as recited in claim 10 wherein said elongated tube and said elements are of a refractory ceramic, said envelope means is a gastight envelope of a material selected from the group consisting of glass, ceramic and quartz and has a diameter which is significantly greater than the tube's outside diameter.

12. The arrangement as recited in claim 11 wherein the diameter of the opening in each element increases from said cavity end to said opposite end, with said laser being operable continuously with a tube temperature of at least 1,000° C., and means for directly coupling said envelope means to said source to provide a direct gas path therebetween.

13. The arrangement as recited in claim 11 further including means for providing a direct gas path between said envelope and said gas source other than through said support means.

14. The arrangement as recited in claim 13 wherein $n$ is in the range of 10 and the tube's temperature is variable between a low value in the range of 600° C. and a high value in the range of 1,300° C. and the operating gas density in said tube varies by less than 50 percent over said temperature range with said tube longitudinally extending in the cavities of said elements with increasing tube temperatures.

15. The arrangement as recited in claim 14 wherein the diameter of the opening in each element increases from said cavity end to said opposite end, with said laser being operable continuously with a tube temperature of at least 1,000° C.

* * * * *